No. 637,086. Patented Nov. 14, 1899.
J. D. C. CHATEAU.
COMPOSING MACHINE.
(Application filed June 27, 1899.)

(No Model.) 7 Sheets—Sheet 1.

WITNESSES:
P. W. Wright
J. C. Connor

INVENTOR
JOSEPH DENIS CYPRIEN CHATEAU

BY
Howson and Howson
HIS ATTORNEYS.

No. 637,086. Patented Nov. 14, 1899.
J. D. C. CHATEAU.
COMPOSING MACHINE.
(Application filed June 27, 1899.)
(No Model.) 7 Sheets—Sheet 3.

WITNESSES:

INVENTOR
JOSEPH DENIS CYPRIEN CHATEAU
BY
HIS ATTORNEYS.

No. 637,086. Patented Nov. 14, 1899.
J. D. C. CHATEAU.
COMPOSING MACHINE.
(Application filed June 27, 1899.)
(No Model.) 7 Sheets—Sheet 4.

WITNESSES:
P. W. Wright
S. C. Connor

INVENTOR
JOSEPH BENIS CYPRIEN CHATEAU
BY Howson and Howson
HIS ATTORNEYS.

No. 637,086. Patented Nov. 14, 1899.
J. D. C. CHATEAU.
COMPOSING MACHINE.
(Application filed June 27, 1899.)
(No Model.) 7 Sheets—Sheet 5.

WITNESSES:

INVENTOR
JOSEPH DENIS CYPRIEN CHATEAU
BY Howson and Howson
HIS ATTORNEYS.

No. 637,086. Patented Nov. 14, 1899.
J. D. C. CHATEAU.
COMPOSING MACHINE.
(Application filed June 27, 1899.)
(No Model.) 7 Sheets—Sheet 6.

WITNESSES:
P. W. Wright.
S. C. Connor.

INVENTOR
JOSEPH DENIS CYPRIEN CHATEAU
By Howson and Howson
HIS ATTORNEYS.

No. 637,086. Patented Nov. 14, 1899.
J. D. C. CHATEAU.
COMPOSING MACHINE.
(Application filed June 27, 1899.)

(No Model.) 7 Sheets—Sheet 7.

WITNESSES:

INVENTOR
JOSEPH DENIS CYPRIEN CHATEAU
BY
HIS ATTORNEYS

United States Patent Office.

JOSEPH DENIS CYPRIEN CHATEAU, OF PARIS, FRANCE, ASSIGNOR TO ANIELLO SAVARETE, OF SAME PLACE.

COMPOSING-MACHINE.

SPECIFICATION forming part of Letters Patent No. 637,086, dated November 14, 1899.

Application filed June 27, 1899. Serial No. 722,049. (No model.)

*To all whom it may concern:*

Be it known that I, JOSEPH DENIS CYPRIEN CHATEAU, engineer, a citizen of the French Republic, residing at 148 Rue Montmartre, Paris, France, have invented certain new and useful Improvements in Composing-Machines, of which the following is a full, clear, and exact description, reference being had therein to the annexed drawings.

This invention relates to an improved typesetting or composing machine.

The composing-machine which is the subject of the present invention utilizes one of the fundamental principles set forth in a prior patent, No. 552,745, dated January 7, 1896—namely, the fall of the types or characters in the form of riders or cavaliers piled up into the compartments of a magazine on an inclined rule, the said types sliding along this rule by reason of their weight and being thus directed to the line-forming and line-separating apparatus furnished with mushroom rails serving to fix the type. The working of the machine forming the subject of the present invention is also based on the use of a keyboard allowing entire words to be composed by the simultaneous manipulation of the keys. This manipulation, although possible, necessitates very long practice on the machine and necessitates the employment of special operators or compositors who are very highly paid. It is therefore advantageous to be able to intrust the manipulation of the machine to any ordinary operator; but in spite of the fact that in the above-mentioned patent it was foreseen that the composing or setting up could be effected by the successive manipulation of the keys this operation cannot be carried out in practice with the desired rapidity for the following reason: When two keys of the board are depressed successively, the corresponding types both fall upon the same rule. The result is that if the first type struck corresponds with a compartment of the magazine situated higher up on the rule than the second it may so happen that the type struck as second will fall on the rule before the first has time to slide lower than the compartment corresponding with this second type. With this hypothesis, which actually is the case when a certain rapidity of fingering is attained, there is produced either an interversion of the type when the first has still remained above the compartment of the second or a meeting or fouling when the first type just passes underneath the compartment of the second at the moment of the descent of this latter. I have therefore been led to cause each character to fall upon a separate rule, so as to leave to each one time for descending to the bottom of the rule, where it is temporarily retained by a fence. The types are afterward all reunited or collected upon a single rule in the order of their descent upon the separate rules. For this purpose I have replaced the inclined fixed rule in the former patent by a series of equidistant inclined rules movable under the magazine in such a manner that the manipulation of each key produces, on the one hand, the fall or descent of a type and, on the other hand, a substitution of the rules under the magazine. This set of rules is combined with a fixed rule placed opposite the bottom of the movable rules at a certain distance from the plane of the magazine, the types being maintained at the bottom of the movable rules up to the fixed rule by a fence and all passing in succession in the order of their descent upon the fixed rule at the moment when they reach the end of the fence. This set of rules may be arranged around the periphery of an inclined cylinder receiving at each manipulation of a key a rotatory movement to an extent corresponding with the separation of two consecutive rules. They may also be carried by a carriage having an intermittent advancing motion and a rapid return motion. Again, they might be arranged in the form of an endless band or belt receiving an intermittent motion or in any other suitable manner. Whatever this arrangement may be, the types being classed upon separate rules having consequently always to descend the whole length of these rules before being reunited on the single rule, it will be perceived that the rapidity of the manipulation of the machine is only limited by the speed or capability of the typist or compositor.

Although the machine so constructed is principally adapted to successive manipulation, it is clear that in certain cases I may cause to simultaneously fall or descend upon the same rule several letters when their compartments are arranged in the order of the composing.

I have combined with the machine whose principle has just been set forth an automatic arrangement for forming and separating the lines, which without being absolutely indispensable advantageously completes the machine, as will be hereinafter explained.

In order to more clearly show the nature of this invention and the means for enabling it to be carried out, I have shown on the annexed drawings a machine constructed according to this invention.

Figure 1:
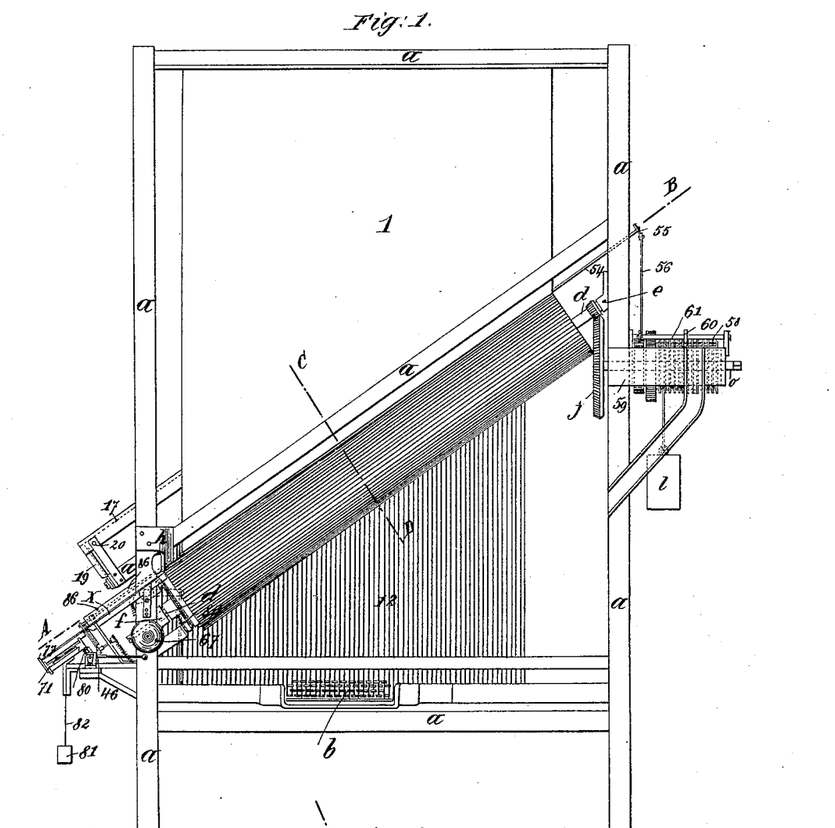
Figure 1 is a front elevation of the whole of the machine.

The machine comprises a framework, Fig. 1, consisting of uprights and a set of cross-pieces, these parts forming the skeleton and being all designated by the letter $a$. The horizontal cross-pieces support the keyboard $b$, which may be of any suitable form and arrangement. In the present example I have adopted the keyboard of the Remington type-writer.

Figure 3:
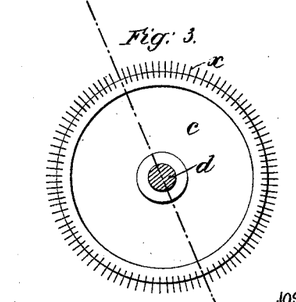
Fig. 3 is a cross-section of the cylinder.

Between the vertical uprights of the framework is mounted the rule-cylinder $c$, whose spindle $d$ enters bearings or supports $ef$, fixed to the framework. A screw $g$, passing through the upright of the framework, serves as a regulable abutment for the lower spindle of the cylinder in its support $f$, Figs. 1 and 9. This cylinder is formed of a suitable metallic skeleton, in which is maintained a series of equidistant rules arranged radially on the generatrices of the cylinder. These rules are formed, preferably, of plate-springs $x$, suitably held along the cylinder, Figs. 3 and 4. Upon the lower part of the rule-cylinder $c$ is arranged a fixed fence $h$, faced with lead and carried by the framework $a$. This fence is situated across a certain number of rules of the cylinder slightly above this, so as to stop the types by the head. It extends across the space formed between the magazine and a fixed rule X, intended to collect all the types, so as to form the line, as will be hereinafter explained.

Figures 15, 16:
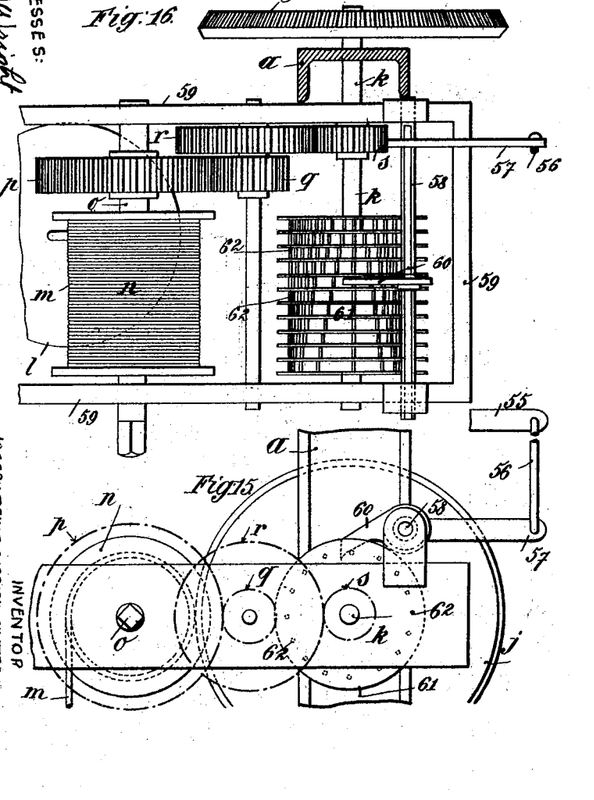
Fig. 15 is a side view of the train mechanism of the cylinder and of the verifying arrangement located at the upper end of the cylinder.
Fig. 16 is a corresponding plan view.

The upper spindle of the cylinder $c$ is furnished with a bevel-pinion $i$, engaging a bevel-wheel $j$, keyed on a shaft $k$, subject to the action of motive force tending to constantly turn it in the same direction. In the present example this force is shown simply as a weight $l$, supported by a cord $m$, winding on a drum $n$, whose shaft $o$ engages the shaft $k$ of the bevel-wheel by means of gear-wheels $p$ $q$ $r$ $s$, intended to retard the fall of the weight, Figs. 1, 15, and 16. It is evident that the weight may be replaced by a barrel-spring or any other motive force. In order that this constant force may effect the rotation of the cylinder only intermittently, I have designed the following arrangement, Figs. 2, 8, 9, and 10:

The bottom end of the cylinder $c$ is fitted with a ratchet-tooth crown-wheel $t$, engaged by a double-pawl escapement altogether similar to that used for the advance of the carriage in a Remington type-writer. This escapement is carried by a shaft $u$, receiving an angular oscillating motion each time that any one of the keys of the keyboard is depressed, as will be presently explained. It consists, as usually, of two pawls, one of which, $v$, is fixed and the other, $w$, is spring-pressed. Both are jointed in the usual manner to any convenient support. A recall-spring $y$ brings back the escapement into its normal position as soon as the key of the keyboard is freed. This escapement plays exactly the same part as in its application to a type-writing machine for the intermittent advance of the carriage. When one of the keys is depressed, the fixed pawl simply takes the place of the movable pawl under the corresponding tooth of the ratchet crown-wheel T. This latter is driven by its spring into the position shown in dotted lines, Fig. 8, but the cylinder $c$ remains immovable. It is only when the key is quite freed that the fixed pawl escapes and the cylinder, actuated by the aforesaid weight $l$, turns until the movable pawl meets its abutment—i. e., turns for a space equal to the distance between two consecutive rules. A spring-pressed pawl 84, engaging a ratchet-wheel 85, also located at the bottom of the cylinder, maintains the latter in its last position, opposing any rearward movement which might result from its sudden stop. Opposite one of the cylinder-rules $x$ there deliver the magazine-tubes, wherein the types are piled.

Figures 4, 6:
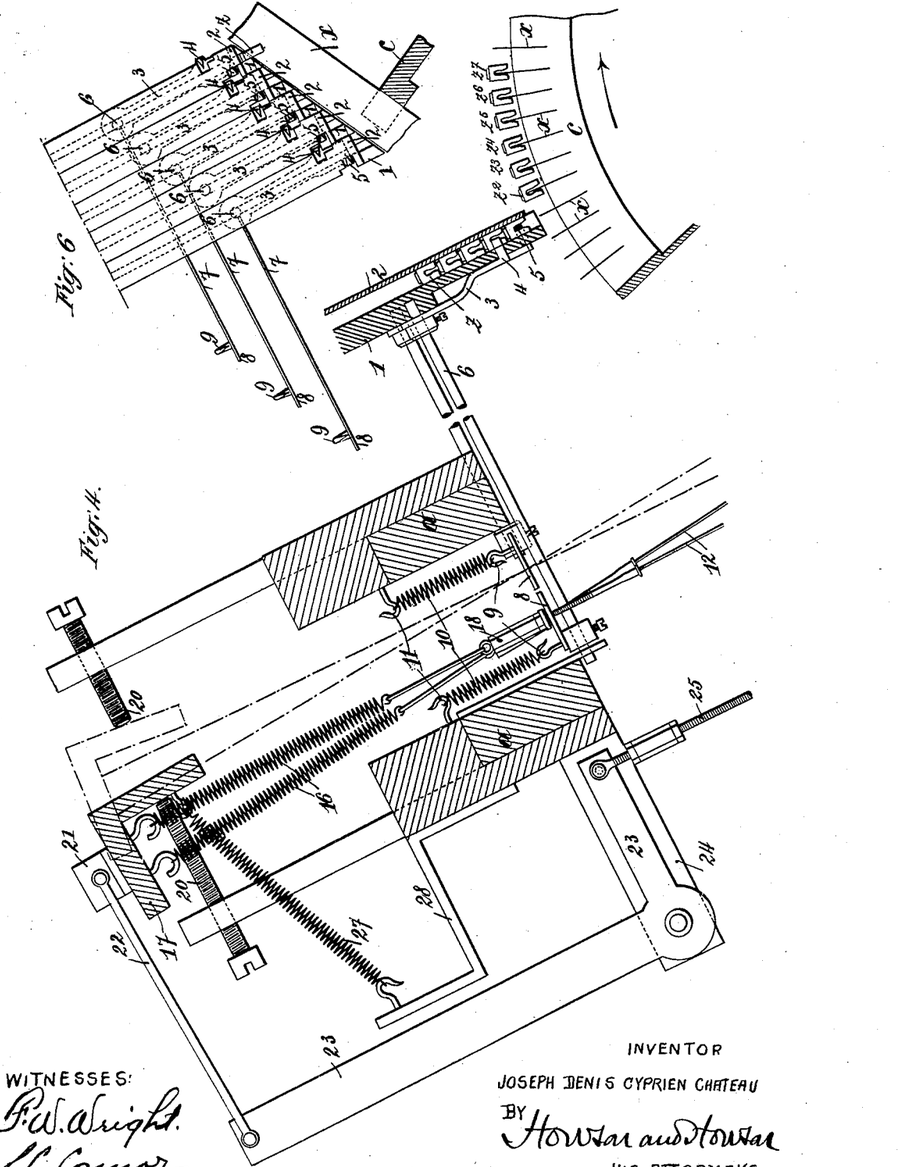
Fig. 4 is a full-size section on line C D of Fig. 1, showing the connection of the draw-rods or draw-wires controlled by the keys of the keyboard with the special escape arrangement of the types.
Fig. 6 is a corresponding front view.
Figure 5:
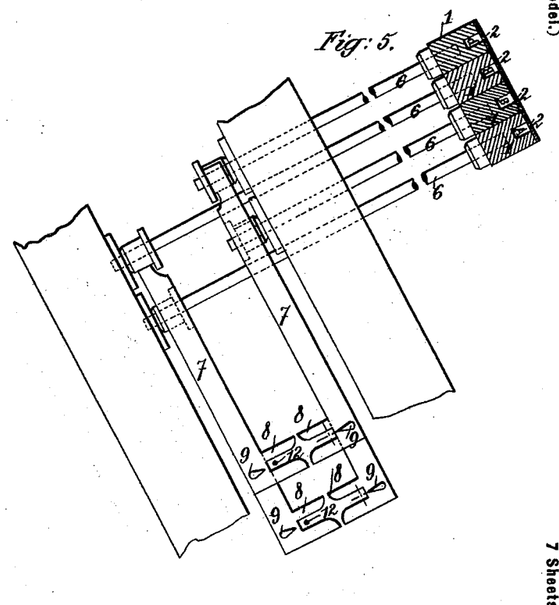
Fig. 5 is a corresponding plan view.
Figure 7:
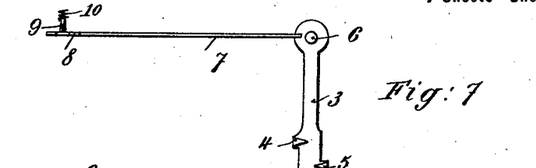
Fig. 7 shows, full size, three rectangular projections of one of the special escape-levers.

The magazine, which is supported in any convenient manner by the framework $a$, is composed of a series of juxtaposed bars 1 of U-section, Figs. 4, 5, and 6. These bars are cut slanting parallel to the axis of the cylinder in such a manner as to level or make even the rules of the cylinder which pass beneath them. They form a series of channels closed at their forward part by a plate 2, which does not extend to the base of the bar, so as to form a free space for the disengagement of the type when the latter is carried along by the rotation of the cylinder. The types are piled or located in the space thus formed in each compartment of the magazine, the free section of the tube varying in size according to the nature of the letter. A part of this plate 2 might be of glass, so as to allow the contents of the compartments to be easily ascertained. The magazine is situated in a plane on the axis of the cylinder $c$. This plane is preferably inclined in the opposite direction to the motion of the cylinder, as shown on Fig. 4; but it may, however, be vertical.

Figure 13:
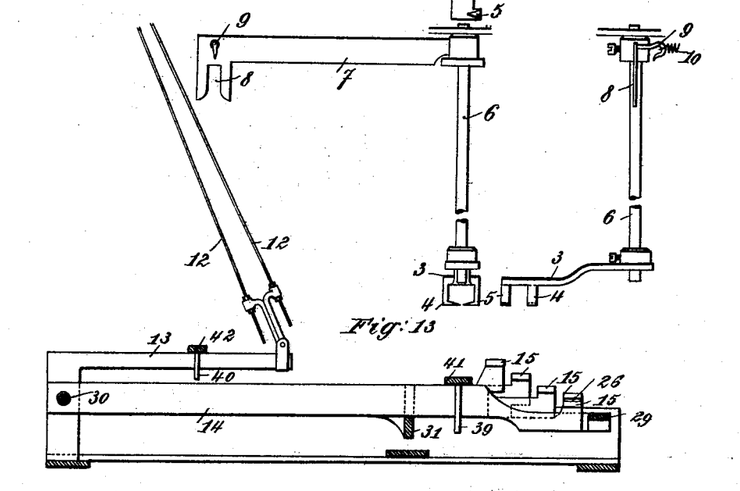
Fig. 13 is a cross-section of the keyboard.
Figure 14:
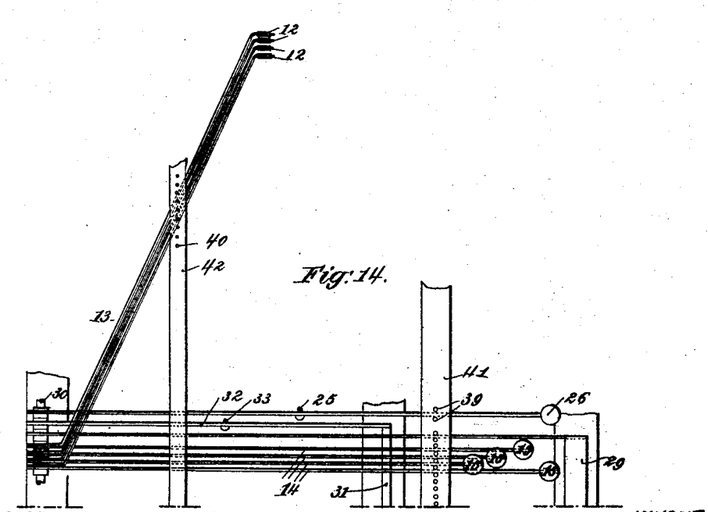
Fig. 14 is a corresponding plan view of part of the keyboard.

Each compartment is furnished at its lower part with a special escapement arrangement allowing the corresponding type to fall when a particular key of the keyboard is depressed upon the rule $x$ of the cylinder, which is at this moment opposite all the openings of the magazine. This escapement arrangement is shown more particularly on Figs. 4, 5, 6, and 7. Each portion of this arrangement consists of an arm 3, furnished at the base with knife-edged hooks, teeth, or nippers 4 and 5, entering a lower portion of each compartment of the magazine through holes formed in the lateral walls of this latter, Fig. 6. This arm is fixed to the end of a shaft 6, journaled partly within the magazine 1 and partly within the framework $a$. At the other end of the shaft 6 is fixed a plate 7, furnished with a lateral fork 8 and a hook 9, serving to fix a recall-spring 10, the other end of which is fixed to the framework $a$ by a hook 11. These parts are grouped two and two, Figs. 4 and 5, in such a manner that the forks 8 are placed opposite one another and the escapements enter two adjoining compartments of the magazine. This grouping in pairs allows the fall, as desired, on depressing the same key of the keyboard of either a small letter or the corresponding capital letter, which are respectively located in the two adjoining compartments of the magazine. Through the forks 8 pass the draw-wires 12, the lower extremity of each of them being connected to a flexible plate 13, fixed angularly to the type-lever 14 of the corresponding key 15 of the keyboard, Figs. 10, 13, and 14. The upper end of the draw-wire 12 is fixed to a recall-spring 16, whose end is attached to an angle-bar or angle-piece 17 parallel to the axis of the rule-cylinder $c$. This wire is preferably formed in two parts connected together by a ring-nut or sprewed socket 18, serving to draw down the one or other of the forks 8. The wires are arranged in the manner of a quincunx, so as to be free in their movement, and all cross at the top of the forks 8; but these wires are independent one of another and they each correspond with a pair of forks placed opposite one another. When one of the draw-wires acts upon one or the other fork 8, the escapement-lever oscillates to one side in such a manner that the upper hook or tooth 4 enters the nick or slot in the last type but one, while the lower tooth 5 leaves the last type, which falls upon the cylinder-rule, thus separating from the column of types supported by the upper tooth 4. When the wire leaves the fork, the oscillation of the escapement-lever takes place in the opposite direction, and the upper tooth 4 leaves the lower type, and the whole column of type then falls upon the lower tooth 5, which has then reached its position for supporting the column.

The movements of the angle-bar 17 and of the draw-wires, which are thereto fixed, are obtained by means of the following arrangement: The angle-bar 17 is supported at its ends by two arms 19, jointed to the frame $a$ of the machine, and is thus capable of receiving an oscillating motion between two abutments or set-screws 20 20, formed by screws mounted on the framework, and allowing the extent of the oscillation to be regulated. The angle-bar is provided with a lug 21, to which is jointed a wire 22, whose other end is connected to one of the arms of a bell-crank lever 23, whose axis of rotation is upon an arm 24, carried by a cross-piece of the framework $a$. To the other arm of the bell-crank lever 23 is attached a draw-wire 25, connected in the same manner as the others to a special key 26 of the keyboard. A recall-spring 27, attached at one of its ends to the angle-piece or angle-bar 17 and at its other extremity to a bell-crank lever 28, fixed to the framework $a$, serves to bring back the angle-bar to its normal position. In such position the ring-nuts 18 of the wire are opposite the forks of the escapements corresponding with the small letters, Fig. 5. When the angle-bar is pushed back into the position indicated in dotted lines on Fig. 4, these ring-nuts are opposite the forks corresponding with the capitals.

The keyboard, which serves to produce by the intermediary of draw-wires, first, the escapement motion of the types from the magazine onto the cylinder-rule; secondly, the intermittent motion of the cylinder, and, finally, the motion of the angle-bar for the fall of the capitals, quite resembles, as has been stated, the keyboard of a Remington type-writer. It comprises, in fact, three classes of keys—namely, the keys 15, upon which are inscribed the different letters of the alphabet, figures, punctuation-marks, &c., a longitudinal space-bar 29, accessible at all parts of the keyboard and serving, preferably, to cause to fall the spaces, (between consecutive words,) and the special key 26, (shift-key,) serving for the composing of the capitals, Figs. 10, 13, and 14. The type-levers 14, carrying the various keys 15, and the space-bar 29 are pivoted upon a common axis 30 and rest freely on a cross-piece 31, supported at its ends by rods 32, jointed on the same axis 30. These rods 32 are connected by wires 33 to arms 34, mounted on an axis 35, held in supports 36. One of these arms 34 is connected in its turn by a wire 37 to a lever 38, solid with the shaft $u$, carrying the double-pawl escapement mentioned above. The result of this arrangement is that when any one of the keys 15 or the space-bar 29 is depressed the cross-piece 31 is lowered at the same time, and thus the advance of the cylinder is effected each time the depressed key is freed. As for the special key 26, it is independent of the cross-piece 31 and serves solely to move the angle-piece 17 without having any effect upon the cylinder. This displacement serves, as has been said, to transmit the movement of the keys 15 to the compartments of the capitals. It might also be combined with the action of the space-bar 29, so as to cause the line-cutters to fall, as will be presently explained.

The separation of the type-levers 13, 14, and 42 is rendered constant by pegs or pins 39 and 40, carried on cross-pieces 41 and 42 of the keyboard, forming a dividing-comb.

The working of this combination of mechanisms is the following:

When any one of the keys of the keyboard is depressed, the movement of this key is simultaneously transmitted to two sets of working parts.

(a) By means of the draw-wire 12, carrying the ring-nut 18, the depression of the corresponding fork 8 is effected, and consequently the angular movement in one direction of the escapement-lever 3. The lower type of the column of types located in the corresponding compartment of the magazine then falls astride the rule $x$, which at this moment is located opposite the line of the magazines. It then occupies the position Z'. (See Fig. 2.) It is maintained in this position by the lateral flange of the compartment, which in the drawings is located at the left of the type. This flange, which levels or evens the rule $x$, forms a fence and prevents the type from sliding under the influence of its weight for so long as the rule remains in this position.

Figure 8:
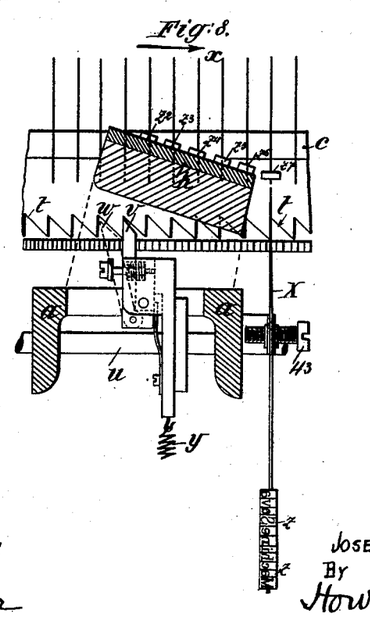
Fig. 8, a view, to same scale, on a plane parallel with the axis of the cylinder of a portion of the lower end of the cylinder, showing the fence and the pawl-escapement determining the intermittent motion of the cylinder.
Figures 9, 10, 11:
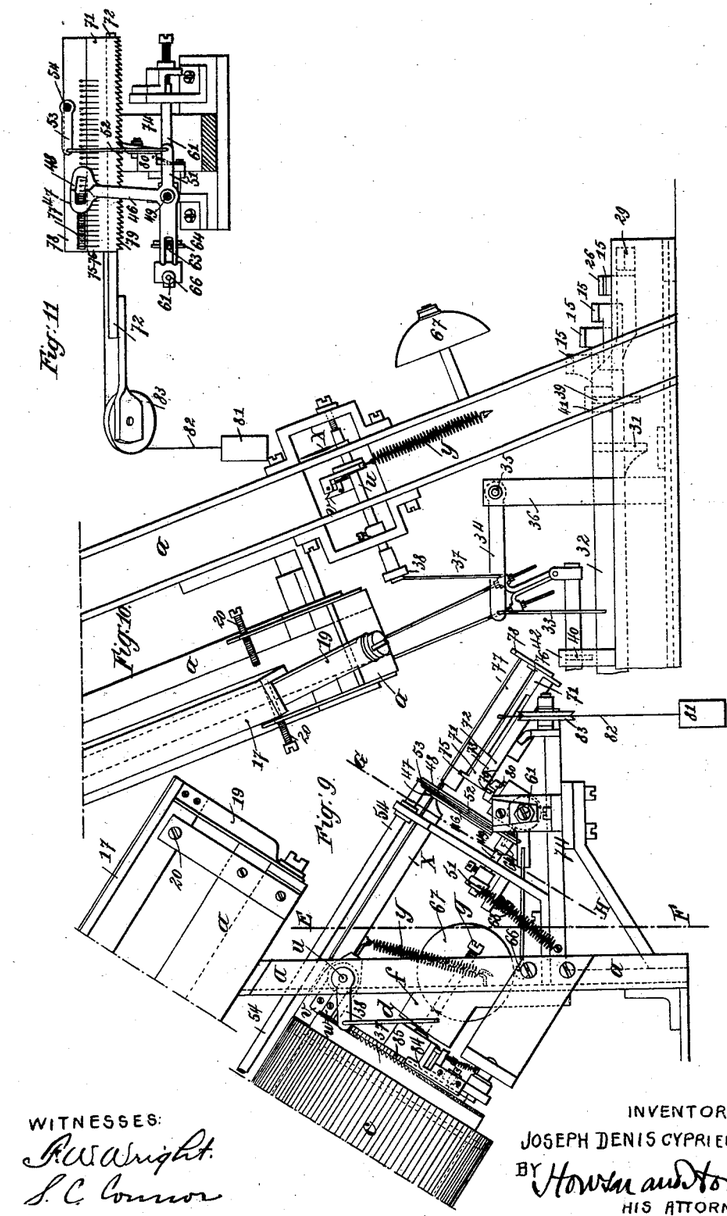
Fig. 9, a rear elevation of the whole of the mechanism for forming the line and for paging located at the lower end of the cylinder.
Fig. 10 is a vertical cross-section on line E F of Fig. 9.
Fig. 11 is a cross-section on line G H of Fig. 9, showing the paging mechanism.

(b) The type-lever 14 of the depressed key draws with it the cross-piece 31 of the keyboard, which by the intermediary of the levers and wires 33, 34, 35, 36, 37, and 38 imparts an angular movement to the shaft $u$, Figs. 8, 9, and 10, of the double-pawl-escapement arrangement determining the intermittent advance of the cylinder. Nevertheless the effect produced by the depression of the key is only that of substituting the fixed pawl $v$ for the movable pawl $w$ against the same tooth of the ratchet; but the cylinder remains immovable.

When the depressed key is freed, the two following effects are produced:

(a) The recall-spring 16, to which is attached the end of the draw-wire 12, brings back this latter upwardly, so that it leaves the fork, which under the influence of a spring 10 is brought back to its normal position. The escapement-lever 3 oscillates in the opposite direction, which, as already stated, causes the descent of the column of types until meeting with the lower tooth 5, which stops the said column slightly above the type which has previously fallen.

(b) At the same time the recall-spring $y$ of the escapement arrangement brings this back to its normal position, the fixed pawl $v$ escapes, and the cylinder turns until stopped by the abutment of the movable pawl $w$—that is to say, it springs forward sharply to an extent equal to the separation of or space between two consecutive rules. This partial rotation of the cylinder has had for effect the advance of the rule which has received the type out of contact with the magazine and to substitute under the magazine with this rule a rule free from all type. The result is that the type finding itself disengaged from a double-hooked device formed in the base of the magazine slides freely along the rule which has received it until it meets the fence $h$ at $z^2$, and the cylinder is then ready to receive another type on a separate rule.

The working which has just been described is repeated under exactly similar conditions each time one of the keys of the keyboard is depressed. Thus on depressing a second key a type falls on the rule which has replaced the preceding one under the magazines, the cylinder remaining immovable. On freeing the key the cylinder at once jumps forward a fraction of a turn, as has been stated, the new type is freed from the magazine, and slides in its turn along the corresponding rule onto the fence $h$, where it occupies the position of the last type $z^2$ set astride the rule; but the rule carrying the type which fell in the first place has itself advanced by the same fraction of a turn, so that the first type has reached the position $z^3$. The manipulation of a third key determines the advance of the first type from $z^3$ to $z^4$ and of the second from $z^2$ to $z^3$, a new type slipping into $z'$. The same results are obtained when the other keys of the keyboard are depressed and released; but since at each manipulation a different rule comes opposite the plane of the magazines the types slide each into a special rule, (unless several keys are depressed simultaneously, as will be presently explained.) The types all collect against the lower fence $h$ until the cylinder has rotated to an extent sufficient for the first type which has fallen to pass the end of this fence at $z^7$. This type then commences to slide and passes over the single rule X, which is arranged in this place in a prolongation of the cylinder-rule. This result is also repeated each time that a key of the keyboard is acted upon, so that the types which were temporarily stopped along the fence on separate rules pass successively over this single rule in the order following which they fell on the cylinder-rules.

The fixed rule X may be furnished at its upper part with a T-shaped piece for retaining the types which are set or threaded on it. Nevertheless its end is thinned or tapered down so as to give every facility of entrance to the types. This end may, besides, be composed of a flexible plate, of which the position can be exactly regulated opposite the rule corresponding with the cylinder by means of a screw device 43. I may also place behind this fixed rule a mirror or reflector 86, Fig. 1, in which the operator can verify his composing, corrected by reflection.

The inclination of the magazine behind the vertical plane on the axis of the cylinder presents in the vertical position several advantages, of which the following are the principal: The types rest against the bottom of the U-shaped bar 1 of each compartment, so that the one which is released by the escapement is guided in the small distance over which it has to travel up to the rule. It reaches that, therefore, in the desired position. Besides, the light adherence which it presents with the bottom of the U on which it has just slipped prevents it from rebounding and coming off the rail. Another advantage of this inclination is that of allowing the types to fall on the rule of the cylinder before this reaches the vertical plane of the axis. The fence $h$ is thus brought back rearward and ends approximately opposite this vertical plane. The types are then able to leave the cylinder and thread themselves upon the fixed rule X under the best conditions of equilibrium. This inclination of the magazine further allows the lengthening of the fence, which, as will be seen farther on, is indispensable when it is wished to retard the slipping of the types on the cylinder. It is nevertheless understood that I may place the magazine vertically in the plane of the axis of the cylinder. The part or rôle of the lower fence $h$ is also very important. It must be of sufficient length to give the types time to descend to the bottom of the cylinder before arriving opposite the fixed rule X. It is important that the types should slip along the cylinder as slowly as possible to avoid their obtaining too much momentum and any tendency to jump. In this order of ideas I may interpose on the length of the cylinder intermediary fences, such as those shown in dotted lines at 44 and 45. In this case the type which is falling into $z'$ is at the first rotation of the cylinder stopped by the first intermediary fence 44, at the second by the second intermediary fence 45, and at the third it reaches the lowermost fence $h$ at $z^4$. This fractional descent in periods interrupted by stoppages prevents the type acquiring a prejudicial acceleration of speed. The inclination of the magazine rearward of the vertical axial plane of the cylinder is favorable to this construction, since, as stated above, it enables the fence $h$ to be lengthened.

Figure 2:
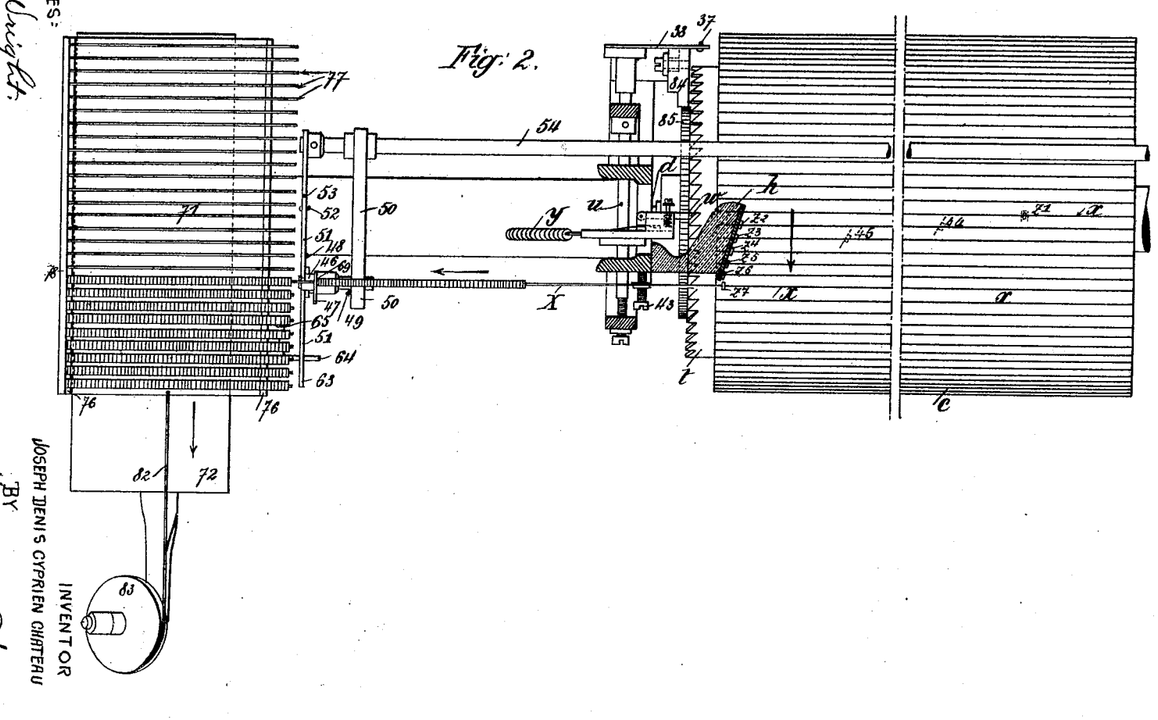
Fig. 2 is a plan on line A B of Fig. 1, scale half full size.

The lower fence $h$ (and in case of such, the intermediary fences) should preferably be inclined, as shown on Figs. 2 and 4, for the type which abuts against it immediately acquires its inclination by coinciding upon the rule, which thus lessens its tendency to rebound. This rebounding is still further prevented by the facing of lead applied to the back of the fence. The lead being an antivibrating metal, kills the vibrations imparted to the fence by the shock from the type, and this latter does not receive the counter-blow.

Figure 12:
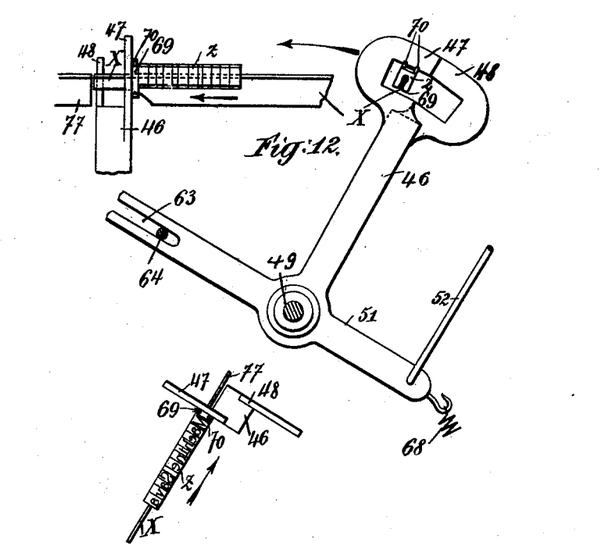
Fig. 12 is a detail view of the special line-escapement, seen as three projections.

The types which are threaded in the desired order on the single rule X should be divided into groups of length corresponding approximately with the justification, and for this purpose I may employ the arrangement which will now be described, which effects this operation automatically and allows this length of line to be varied, as desired. This arrangement is shown on Figs. 1, 2, 9, 10, 11, 12, 15, and 16 of the drawings. The rule X passes through a lever 46, whose summit comprises two hooks 47 48, leaving a free space sufficient to allow, in no matter what position, the passage of the ordinary types which come astride the rule across the hooks. This lever 46 is mounted on a shaft 49, journaled in a support 50, and it is solid with a perpendicular lever 51, of which one arm terminates in a fork 63, traversed by a rod 64, oscillating on a shaft 65, the end of the rod carrying a hammer 66, acting on a gong 67, mounted on the framework $a$. The end of the other arm of the lever 51 is attached to a recall-spring 68 and is connected by a wire 52 with the arm 53 of a shaft 54, supported parallel to the cylinder behind the magazine. This shaft carries at its other end a second arm 55, connected by a wire 56 with an arm 57 solid with a shaft 58, mounted loosely in a chase or frame 59, which supports the drum $n$ on which is wound the cord of the weight imparting motion to the machine, Figs. 15 and 16. Shaft 58 carries an index or finger 60, capable of sliding longitudinally on a keyway on this shaft, which renders it solid with the latter in the direction of rotation. Parallel to the same shaft 58 is mounted another shaft $k$, carrying a bevel-wheel $j$, controlling the rotation of the cylinder. This shaft carries a lantern-wheel 61, formed of a series of disks each furnished with pegs 62, which are all equidistant from the axis of its shaft $k$. Each of these disks carries on the same circumference a number of equidistant pegs or pins, this number varying progressively from one disk to the next. The index 60 may be placed opposite the pegs of any one whatever, according to the length of the line to be obtained, as will presently be described. In order to effect the working of this arrangement, I make use of a special type 69, called "line-cutter," the height of which is increased by the addition thereto of horns or points 70, Fig. 12, or by any other superelevation. This type is furnished from a compartment of the magazine corresponding with a key of the keyboard or the space-key 29. At the commencement of working the machine I begin by causing to fall a line-cutter type, which after having passed through all the stages or phases of the stroke of a type threads itself upon rule X, and riding along the same slides until the points or horns 70 meet the first hook 47 of the special lever 46. The types which fall after the line-cutter are stopped by the latter until the cylinder c has passed through an angle sufficient for one of the pegs 62 of the disk, opposite which the index or finger 60 has been placed to raise this finger, the angular movement of this latter being transmitted by the intermediary of various working parts 52 and 57 to the double-hooked lever 46, which inclines itself in the direction of the arrow, Fig. 12, in such a manner that the line-cutter escapes the hook 47 and slides with the types, which follow it until it meets with the hook 48, by which it finds itself again stopped. The cylinder continuing to turn, the index or finger 60 escapes the peg 62, which has raised it and falls back, which allows it to return to its first position of the lever 46 under the influence of the recall-spring 68. In consequence of this motion the lever 48 leaves in its turn the line-cutter 69, which is then free to slide on the rule with all the types which bear upon it, which pass freely under the lever 47 48. In the second movement of the lever the rod 64, drawn by the bell-crank lever 51, throws forward the hammer against the gong, and the operator is thus warned that he must cause a new line-cutter to fall on the cylinder. This working is thus repeated indefinitely. The series of types being thus divided in lines, the latter are led successively on a series of rails mounted on a carriage, which advances automatically for a space equal to the space between the two consecutive rails at each movement of the lever 46. This carriage (see Figs. 2, 9, and 11) is formed of a framework 71, capable of sliding on a plate 72, to which it is connected by a dovetail joint 73. The plate is supported on the framework by the intermediary of several brackets 74. The carriage 71 is subject to the constant action of a counterweight 81, carried by a cord 82, attached to the carriage and passing over a pulley 83. The upper flanges 75 76 of the chase or framework comprises a series of equidistant nicks or grooves for the lodging of the rails 77. The flange 76 is superraised by an abutment-plate 78, which has for its purpose to stop the types. The lower part of the flange 75 is driven by a rack 79, with which there engages a double-pawl escapement 80, identical with that which controls the cylinder. (Refer to Fig. 8.) This escapement 80 is mounted on the shaft 65, which actuates the hammer of the gong. At the first movement of the lever 46 the carriage advances in such a manner as to present an empty rail opposite the rule X, and the second movement (which acts on the gong) produces a simple substitution of the movable pawl for the fixed pawl in the escapement 80 without moving the carriage. It is in this second movement that the line-cutter escapes the hook 48 of the lever 46 and that the row of types which follows it slides freely in such a manner as to occupy the free rail of the carriage, which has been brought back opposite the rule X by the first movement. This working is repeated until the different rails of the carriage are furnished with lines of type. Then the carriage is replaced by another.

It should be understood that the keyboard indicated in the preceding description might be replaced by any other arrangement of keyboard. Thus in place of having the same key for the capital and the small letter I may have separate keys, as on certain typewriting machines, which would dispense with the mechanism of the special key 26 for the capitals, as well as with the forks 8 of the escapement-plates, the wires being then fixed directly to the said plates 7. I may also adapt to the machine a keyboard arranged for simultaneous manipulation. This is even considerably facilitated by the fact that the types which have fallen simultaneously are all held in their respective places on the rule by the lateral walls of the magazine-tubes as long as the depressed keys have not all been freed.

Certain magazines may contain types composed of several letters—such as "ll," "ss," "ent," "tion," &c.

I claim as my invention—

1. A composing-machine, having a magazine for type and a keyboard controlling the type-supply in combination with a movable series of rules for the reception of the types, means for imparting intermittent motion to this series of rules to bring a new rule opposite the magazine at each feed motion, a fence placed across a number of the rules for the temporary maintenance of the types, and a fixed rule for collecting the types in the form of a line, as above set forth.

2. A composing-machine having a magazine for type and a keyboard controlling the type-supply in combination with an inclined series of rules for the reception of the type, means for imparting intermittent-feed motion to this series of rules from the keys to bring a new rule opposite the magazine on the manipulation of the key, a fence placed across a number of the rules for the temporary maintenance of the types and a fixed rule for collecting the types in the form of a line, substantially as described.

3. A composing-machine having a magazine for type and a keyboard controlling the type-supply in combination with an inclined rotary cylinder carrying a series of rules for the reception of the type, means for imparting intermittent-feed motion to the cylinder to bring a new rule opposite the magazine at each feed motion, a fence placed across a number of said rules for the temporary maintenance of said types and a fixed rule for collecting the types in the form of a line, substantially as described.

4. In a composing-machine, the combination of an inclined cylinder having rules with a fence extending between the plane of the magazine and the end of the single rule for collecting the types, across several rules of the cylinder, the said fence being inclined relatively to the generatrices of the cylinder and faced with lead to prevent the rebounding of the types, substantially as described.

5. In a composing-machine, the combination with a magazine and an inclined cylinder provided with rules, of a keyboard, draw-wires and recall-springs, connecting the ordinary keys of the keyboard to escapement-levers having hooks or nippers 4, 5 entering the base of each compartment of the magazine, this base comprising laterally a wall flush with the rule so as to retain the type and being hollowed or grooved forwardly for the disengagement of the type, substantially as and for the purpose described.

6. In a composing-machine, the combination with an inclined cylinder furnished with rules, and with a magazine, of a keyboard of ordinary keys, draw-wires carrying ring-nuts and recall-springs attached to an angle-bar connected by an arrangement of levers and a wire to a special key 26 of the keyboard intended to impart to this angle-bar a lateral motion, escapement-levers arranged in pairs and containing in each such pair forks placed opposite one another, so as to receive as desired upon the manipulation of the key 26 the action of the ring-nut of the corresponding draw-wire substantially as and for the purpose described.

7. In a composing-machine, the combination of a magazine and inclined rule-cylinder and the ordinary keys of the keyboard with a cross-piece upon which they all rest, the said cross-piece being connected by wires and an arrangement of levers to a shaft fitted with a double-pawl escapement engaging a ratchet-wheel on the rule-cylinder subject to the constant action of a motive power for the purpose of imparting to the cylinder a partial rotatory movement upon the manipulation of any one of the keys, substantially as described.

8. In a composing-machine, the line-formation mechanism, comprising a lever having escapement-hooks 47 48, traversed by a single rail for collecting the types, the opening of the hooks being sufficient to allow at all times free passage to the ordinary types and to retain only temporarily a higher or more elevated type termed "line-cutter" in combination with an index-finger 60 located opposite an arrangement of peg-disks on a moving part of the mechanism the said index-finger being connected with the shaft of the lever 46 by levers and with a gong to transmit to the latter the oscillations imparted to it by the pegs of one of the disks, substantially as and for the purposes described.

9. In a composing-machine, the combination of a rule for collecting the types, of an escapement-lever 46 having escapement-hooks, capable of receiving an angular intermittent movement with a carriage 71 furnished with equidistant rails parallel to the single rail and fitted at its bottom with a rack and an escapement controlled by the movement of the lever 46 to bring each of the rails into line with the single rail at the movement of the lever 46, substantially as described.

In testimony whereof I have signed my name to this specification in the presence of two subscribing witnesses.

JOSEPH DENIS CYPRIEN CHATEAU.

Witnesses:
EDWARD P. MACLEAN,
CHARLES DONY.